United States Patent [19]

Balukin et al.

[11] Patent Number: 4,971,399
[45] Date of Patent: Nov. 20, 1990

[54] SYSTEM FOR ASSURING RECHARGE OF BRAKE PIPE PRESSURE IN HOLDING POSITION OF LOCOMOTIVE BRAKE VALVE

[75] Inventors: Richard F. Balukin, Pittsburgh; Robert J. Worbois, North Huntingdon; John R. Reiss, North Versailles; Frank J. Jerina, Irwin, all of Pa.

[73] Assignee: American Standard Inc., Wilmerding, Pa.

[21] Appl. No.: 432,004

[22] Filed: Nov. 6, 1989

[51] Int. Cl.⁵ ............................................. B60T 11/34
[52] U.S. Cl. ........................................ 303/33; 303/20
[58] Field of Search .................. 303/3, 15, 18, 20, 33, 303/35, 56, 57, 71

[56] References Cited

U.S. PATENT DOCUMENTS

| | | | |
|---|---|---|---|
| 2,580,348 | 12/1951 | Erson | 303/18 |
| 3,504,950 | 4/1970 | McClure | 303/35 |
| 4,013,322 | 3/1977 | Worbois et al. | 303/18 |
| 4,113,320 | 9/1978 | Balukin | 303/54 |
| 4,491,372 | 1/1985 | Walley | 303/18 |
| 4,598,953 | 7/1986 | Wood et al. | 303/71 |

Primary Examiner—Robert P. Olszewski
Assistant Examiner—Nguyen Tan
Attorney, Agent, or Firm—J. B. Sotak

[57] ABSTRACT

In an electropneumatic brake control system including a brake valve in which a holding position permits brake pipe recharge without effecting a concurrent release of brakes, there is provided an arrangement for preventing a release control valve of a penalty application valve from being actuated to a position in which charging of equalizing reservoir pressure is interrupted when the brake valve handle is in Holding position, as well as Release position during electropneumatic brake control, while preventing such actuation of the penalty release control valve only in Release position in the event the electropneumatic brake control is inoperative.

8 Claims, 3 Drawing Sheets

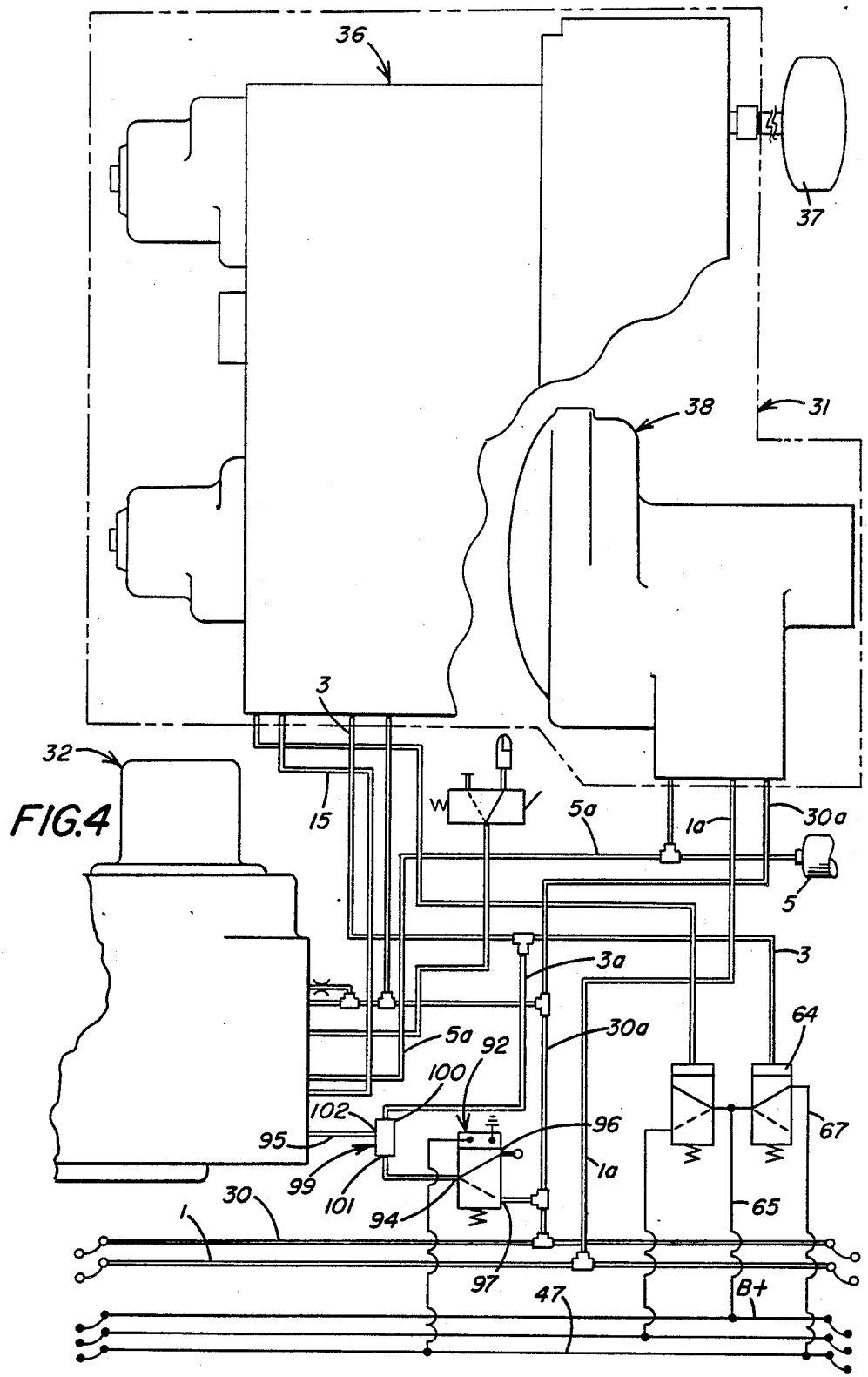

SYSTEM FOR ASSURING RECHARGE OF BRAKE PIPE PRESSURE IN HOLDING POSITION OF LOCOMOTIVE BRAKE VALVE

BACKGROUND OF THE INVENTION

The present invention relates to an electropneumatic brake control system for a railway train in which the train brake pipe pressure can be recharged without concurrently effecting a release of the train brakes.

A brake equipment of the foregoing type employs trainline wires via which an application magnet valve and a holding magnet valve on each car is controlled. The application magnet valve effects a reduction of brake pipe pressure electrically in response to which the car control valve operates to supply air to the car brake cylinders, when a brake application is initiated through the locomotive brake valve. When it is desired to recharge the train brake pipe without concurrently releasing the car brakes, the locomotive brake valve is set in holding position, wherein the car holding magnet valve interrupts the exhaust of brake cylinder pressure via the car control valve until such time as the brake valve is moved to release position, it being understood that the brake valve in holding position establishes recharging of the train brake pipe the same as in release position. Typically, a standard 26-E type brake valve having electrical contacts controlled by movement of the brake valve handle has been employed to control the trainline wires through which the foregoing application and holding magnet valves are operated.

The recently introduced 30-type brake valve has been designed for desk-style mounting to meet the desire to modernize locomotive cab designs, as opposed to the pedestal-style 26-type brake valves. In developing a 30-type brake valve capable of operating trainline wires in the manner of the aforementioned 26-E brake valve, one such design employs pressure-actuated electrical switches that are operable in response to the different handle positions of the brake valve, as opposed to handle-operated electrical contacts. One such pressure switch is controlled in accordance with the pressure state of a pneumatic signal that transitions between release and holding positions of the brake valve.

This pneumatic signal also controls a release control valve of the standard P-2-A brake application valve. When employed with safety monitoring devices such as periodically require the operator to indicate his alertness and well-being, for example, the P-2-A brake application valve enforces an automatic penalty brake application in the event such periodic acknowledgment is not forthcoming. This is accomplished by venting equalizing reservoir pressure which, in turn, causes the brake valve relay valve portion to vent brake pipe pressure in a well-known manner and thereby force the car control valve to effect an automatic brake application in circumvention of the operator's control, i. e., with the brake valve handle set in release position.

The pressure state of the aforementioned pneumatic signal, that controls both the holding magnet valve and the release control valve of the P-2-A brake application valve, transitions when the brake valve handle is moved out of release position, as required to reset the P-2-A brake application valve. This pressure transition of the pneumatic signal conditions the release control valve of the P-2-A brake application valve to cut off communication between the equalizing reservoir and its charging source while equalizing reservoir pressure is vented via the main spool of the P-2-A brake application valve. If it is desired to recharge the brake pipe without releasing the brake application in electropneumatic mode of operation, by moving the brake valve handle to holding position, the pneumatic signal controlling both the holding magnet valve as well as the release control valve of the P-2-A brake application valve does not transition back to the pressure state condition it normally assumes in release position. Consequently, no pressure signal is available to reset the release control valve from its actuated position to which it is operated by "lockover" port pressure during reset of the P-2-A brake application valve main spool.

Since the release control valve in its actuated position cuts off the recharging of equalizing reservoir pressure, the brake valve relay valve portion, which responds to the equalizing reservoir/brake pipe pressure differential, is in effect rendered inoperative to recharge the brake pipe pressure. Thus, the brake valve handle must be moved to release position in order to obtain a pressure signal to reset the release control valve and thereby permit the equalizing reservoir pressure and thus the brake pipe pressure to be recharged. However, since this effects a brake release, it will be appreciated that the advantage of a brake valve device and appropriately designed equipment to permit recharging the brake pipe pressure without concurrently releasing the train brakes in holding position of the brake valve is not realized.

SUMMARY OF THE INVENTION

The object of the present invention is to prevent the release control valve of a conventional P-2-A brake application valve from being actuated to cut off charging of the equalizing reservoir pressure in all brake valve handle positions, including holding position, during electropneumatic control of the train brakes.

It is a further object of the invention to provide the foregoing objective without affecting conventional operation of the P-2-A brake application valve during automatic pneumatic mode of brake control.

Briefly, in accordance with the foregoing objectives, there is provided an electropneumatic brake control system for a railway vehicle having trainline wires including a holding wire via which electric brake control signals are transmitted, and a brake pipe via which fluid pressure brake control signals are transmitted for effecting control of the vehicle brakes. The brake control system includes an equalizing reservoir and a brake valve including a regulating valve that provides for charging the equalizing reservoir in release and holding positions of the brake valve. In addition, the brake valve includes a suppression valve that connects a source of fluid under pressure to a first passageway to which a pressure switch is connected for deenergizing the holding wire when the brake valve is in release position and energizing the holding wire in all other handle positions.

When employing a well-known type of penalty application valve device, the charging flow path to the equalizing reservoir is via the release control valve of the penalty application valve, in order to prevent charging of the equalizing reservoir (which in turn prevents release of the brakes) in certain handle positions during penalty brake application reset conditions. When the electropneumatic brake control is inoperative, so that the brake control reverts to automatic pneumatic control, it is desired to withhold charging of the equalizing reservoir and thus release of brakes until the brake valve handle is in release position. However, so long as electropneumatic brake control is operable, the charging of the equalizing reservoir must be permitted to occur in holding position, as well as in release position, in order to realize the desired function of recharging the train brake pipe without concurrently releasing the train brakes, it being understood that the electropneumatic control electrically cuts off the exhaust of brake pressure in holding position while the equalizing reservoir and thus the brake pipe is being recharged.

In order to carry out these requirements, an electropneumatic valve means connects fluid under pressure in the first passageway to a second passageway in response to deenergization of the holding wire, the pressure in this second passageway being effective to prevent the release control valve from being actuated to a position cutting off charging of the equalizing reservoir. Whenever the holding wire is energized, due to pipe 3 being depressurized in all handle positions except release or by loss of electropneumatic control, the electropneumatic valve disconnects fluid under pressure in the first passageway from the second passageway and, instead, connects the aforementioned source of fluid under pressure directly to the second passageway.

BRIEF EXPLANATION OF THE DRAWINGS

The foregoing objects and other objects and advantages of the invention will become apparent from the following more detailed explanation when taken in conjunction with the drawings in which:

FIG. 4 is an alternate embodiment of the invention of FIG. I shown in outline.

DESCRIPTION AND OPERATION

Figure 1:
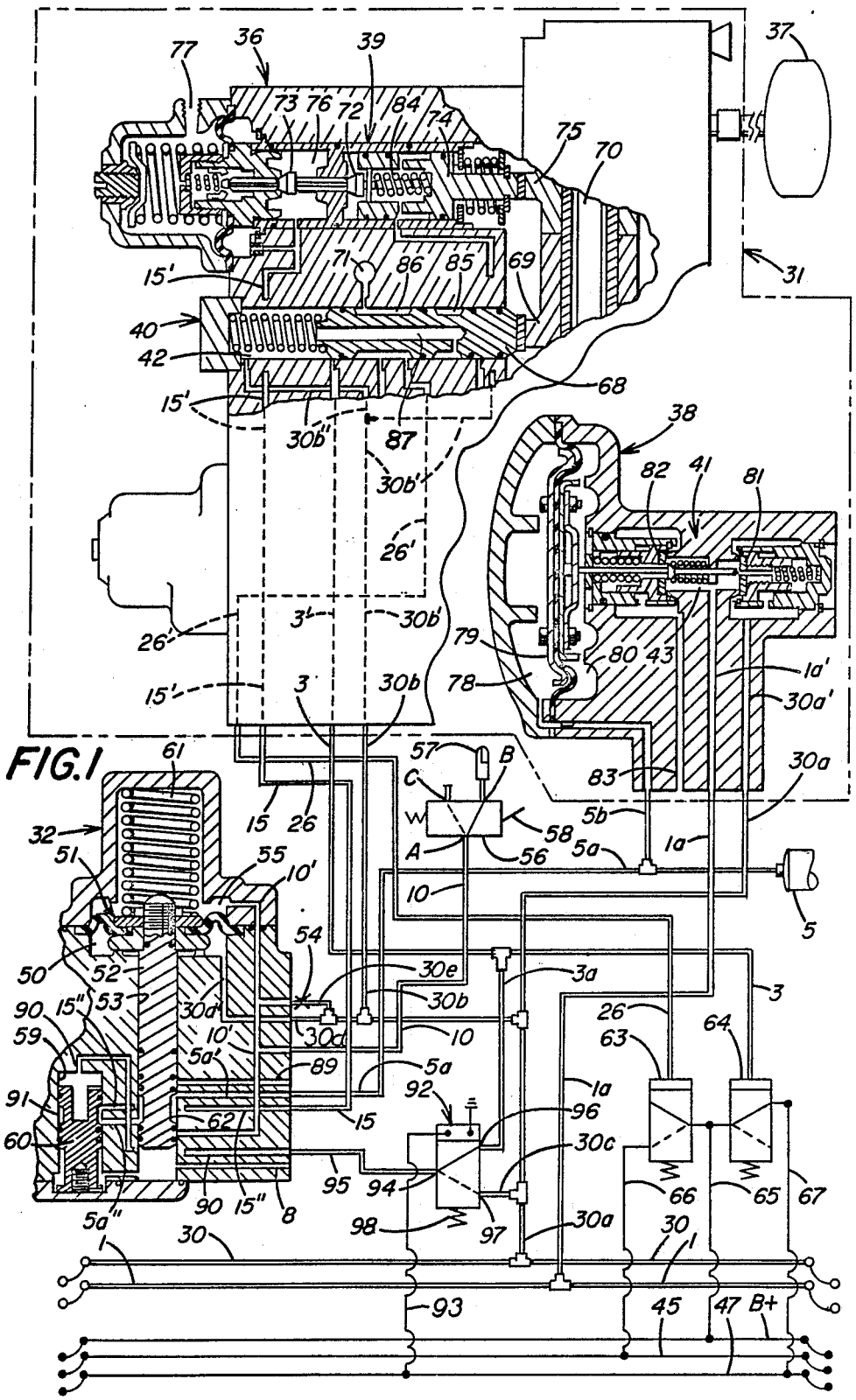
FIG. 1 is a schematic of an electropneumatic brake system having a penalty brake arrangement including a non self-lapping type brake valve shown partly in section and a penalty brake application valve shown in section.
Figure 2:
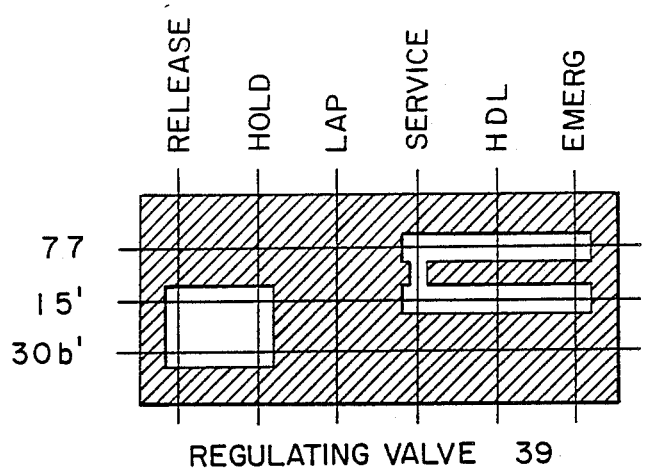
FIGS. 2 and 3 are position diagrams indicating graphically the port connections made by the regulating valve and suppression valve portions of the brake valve device of FIG. 1.
Figure 3:
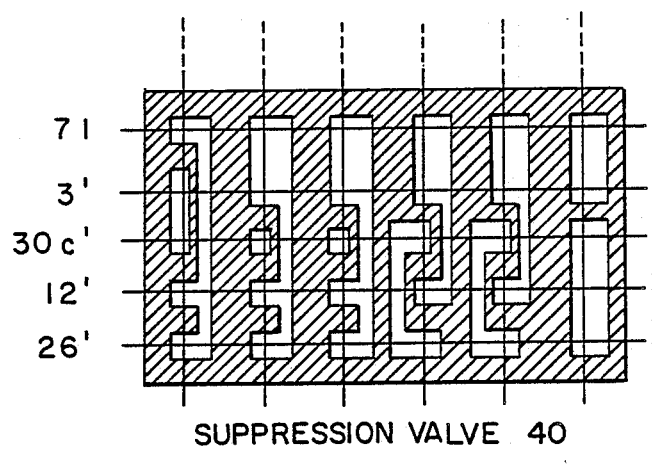

Referring now to FIG. 1, there is shown an electropneumatic brake system for a passenger-type rail vehicle including a modular brake valve device 31 and a penalty brake application valve device 32. Brake valve device 31 comprises a pressure regulating module 36 that is mounted desk-style for operation by movement of a brake valve handle 37, and a relay valve module 38 that is remotely mounted relative to module 36, and to which the train brake pipe I is connected via a branch pipe 1a. Pressure regulating module 36 may be a standard, well-known 30A-CDW brake valve portion, as shown in WABCO O. & M. publication 4208-30, including a combination self-lapping and non self-lapping regulating valve 39 and a suppression valve 40 that has been modified to provide the passage connections as indicated in FIGS. 2 and 3. Relay valve module 38 may be a standard well-known C-2-W relay valve portion, also shown in WABCO 0. & M. publication 4208-30, including a relay valve 41. Features of this brake valve device 31 have been disclosed in U.S. Pat. No. 4,113,320 and subsequently employed in well-known 26-E type brake valve devices.

Brake valve handle 37 is provided with several distinct handle positions, including Release, Holding, Lap, Service, Handle Off, and Emergency, each position being defined by a detent. Regulating valve 39 is designed to give the operator the option of recharging the brake pipe 1 without concurrently releasing the train brakes. In that regulating valve 39 is non self-lapping from lap through emergency positions, the provision of distinct Lap and Service positions is required, between which the brake valve handle must be manipulated in order to control the degree of service brake application desired, as compared to brake valves having self-lapping regulating valves that automatically vary the degree of service application according to the position of the brake valve handle in a service zone of application between Release and Emergency positions.

A source of compressed air is supplied to a main reservoir pipe 30 that is continuous through the train. A branch pipe 30a connects this compressed air from pipe 30 to the relay valve 41 via passage 30a'. Relay valve 41 supplies main reservoir pressure from passage 30a' to the train brake pipe 1 via a delivery chamber 43, passage 1a', and branch pipe 1a. Another branch pipe 30b connects the compressed air from branch pipe 30a to regulating valve 39 of pressure regulating module 36 via passage 30b' and to a spring chamber 42 of suppression valve 40 via a branch passage 30b''.

Arranged in conjunction with regulating valve module 36 of brake valve device 31 are pressure switches 63 and 64. These pressure switches each include a pneumatic actuator portion to which pipes 26 and 3 are connected, and a spring-biased, single-pole, single-throw switch portion. The movable switch member of pressure switches 63 and 64 are connected by a wire 65 to a trainline wire B+ that is connected to a source of electrical power. A normally open contact of pressure switch 63 is connected by a wire 66 to application wire 45, while the normally closed contact of pressure switch 64 is connected by a wire 67 to holding wire 47.

Pipes 26 and 3 are connected to brake valve pressure regulating module 36 from where these pipes are, in turn, connected to suppression valve 40 via corresponding passages 26, and 3, Suppression valve 40 comprises a spool member 68 that is operable through a cam member 69 mounted on a shaft 70 of handle 37, in the different handle positions, to establish the pressurization and depressurization of the respective passages 26' and 3', as indicated in the position diagram of FIG. 3. In their depressurized condition, these passages 26' and 3' are connected to an exhaust port 71 of suppression valve 40, while in their pressurized condition, these passages 26' and 3' are connected to main reservoir pipe 30 via passage 30b'', 30b', 30b, and 30a.

The aforementioned regulating valve 39 includes a supply valve 72 and an exhaust valve 73, as well as a spool valve 74. Regulating valve 39 is operable through a cam member 75 mounted on shaft 70 independently of cam member 69. Supply valve 72, in conjunction with spool valve 74, controls the supply of compressed air from passage 30b' to a delivery chamber 76, and exhaust valve 73 controls the exhaust of compressed air from delivery chamber 76 to atmosphere via a vent port 77. A passage 15' and associated pipe 15 connects this delivery chamber 76 to an equalizing reservoir 5 via penalty application valve 32 and a pipe 5a. A branch pipe 5b is connected from pipe 5a to a control chamber 78 of relay valve 41. A control piston 79 separates control chamber 78 from a feedback or compensating chamber 80 with which brake pipe pressure effective in delivery chamber 43 is communicated. A supply valve 81 controls the supply of compressed air from passage 30a' to delivery chamber 43, while an exhaust valve 82 connects delivery chamber 43 to an exhaust passage 83.

Penalty application valve 32 may be a well-known P-2-A brake application valve, such as shown and described in WABCO Instruction Pamphlet G-g-5071-6. Only the valving and passageways necessary for an understanding of the present invention have been shown for the sake of clarity.

A branch pipe 30d of branch pipe 30b is connected to a passage 30d' of penalty application valve 32 leading to a chamber 50 formed on one side of a piston member 51 to which a spool valve member 52 is connected for operation in a bore 53. A branch pipe 30e having a choke 54 is connected to a passage 10' of penalty application valve 32 leading to a chamber 55 on the other side of piston 51, and to spool valve bore 53. This passage 10' is connected via a pipe 10 to the inlet port A of pedal-actuated, spring-returned, two-position, three-way pneumatic valve 56, such as the well-known operator's foot valve device typically employed for safety control purposes on railway train locomotives. Inlet A is normally connected to a warning whistle 57 via an outlet port B and is cut off from port B and connected to a blanked port C when the foot valve device is actuated by depressing its foot pedal 58.

Pipe 15 is connected to a passage 15" that is, in turn, connected to the bore 59 of a release control spool valve 60. Another passage 5a' is connected between pipe 5a and the bore 53 of spool valve member 52. A spring 61 biases piston member 51 toward the position shown in which an annular groove 62 in the spool valve member 52 connects passage 5a' to a passage 5a" that also leads to the bore 59 of spool valve member 60. An exhaust passage 89 is connected to the bore 53 of spool valve member 52 for registry with passage 5a' via spool groove 62 when the spool valve member 52 is actuated. A passage 90 is connected to the face of spool valve member 60 so that in response to pressurization, spool valve member 60 is urged toward the position shown in which an annular groove 91 in the spool member connects passage 15" to passage 5a". Finally, a "lockover" passage 8 connects the underside of spool valve members 52 and 60 to atmosphere via an ancillary valve device (not shown). It is well understood to those skilled in the art that such ancillary valve device normally vents "lockover" passage 8 and when operated, interrupts the exhaust of passage 8 to allow pressure buildup on the underside of spool members 52 and 60, and in chamber 55 of spool member 52 to effect reset of the penalty application valve.

The solenoid operator of an electromagnetic valve device 92 is connected by a wire 93 to the holding wire 47. The pneumatic portion of electromagnetic valve device 92 includes an outlet 94 that is connected to passage 90 of penalty application valve 32 via a pipe 95, an inlet 96 that is connected to pipe 3 via a pipe 3a, and an inlet 97 that is connected to branch pipe 30a via pipe 30c. When energized, outlet 94 is connected to inlet 97 and disconnected from inlet 96, and when deenergized, outlet 94 is disconnected from inlet 97 and connected to inlet 96 by the action of a spring 98.

RELEASE AND CHARGING

In Release position of handle 37, cam member 75 positions spool valve 74 to admit compressed air from passage 30b' to regulating valve supply valve 72, which is open, exhaust valve 73 being closed. Compressed air is thus supplied to equalizing reservoir 5 from main reservoir pipe 30 via branch pipe 30b, passage 30b', spool valve 74, the open supply valve 72 of regulating valve 39, delivery chamber 76, passage 15' pipe 15, penalty application valve 32 and pipe 5a, as indicated in the position diagram of FIG. 2 relative to Release position. The compressed air supplied to equalizing reservoir 5 is terminated automatically by closure of supply valve 72 when the pressure setting of regulating valve 39 is reached.

Equalizing reservoir pressure is effective in control chamber 78 of relay valve 41 to effect closure of exhaust valve 82 and opening of supply valve 81. Compressed air is thus connected from main reservoir pipe 30 to brake pipe 1 via branch pipe 30a, passage 30a', the open supply valve 81, passage 1a', and branch pipe 1a. This charging communication continues until the feedback of brake pipe pressure to compensating chamber 80 causes relay valve 41 to close supply valve 81, at which point the brake pipe pressure is charged in accordance with the equalizing reservoir pressure established by regulating valve 39.

At each car of a train, this increase in brake pipe pressure is effective to charge the various reservoirs and concurrently condition the car control valve device (not shown) to exhaust brake cylinder air in a well-known manner.

Also in Release position of handle 37, suppression valve 40 establishes the passage connections, as indicated in the position diagram of FIG. 3. Cam member 69 positions spool valve 68 to connect compressed air from main reservoir pipe 30 to pipe 3 via branch pipes 30a and 30b, passage 30b', spring chamber 42, and passage 3'. At the same time, pipe 26 is vented via passages 26', spool valve 68, and exhaust port 71.

Pressurization of pipe 3 in conjunction with depressurization of pipe 26 causes pressure switches 63 and 64 to disconnect trainline wire B+ from the respective application and holding wires 45, 47. The application and holding magnet valves on each car are thus deenergized. This results in brake pipe pressure being blanked by the application magnet valves and the control valve exhaust being vented to atmosphere by the holding magnet valve.

Accordingly, the brake system is charged and the brakes released in a well-known manner.

SERVICE

When it is desired to make a service brake application, brake valve handle 37 is moved from Release position to Service position Spool valve 74 is moved in the right-hand direction to cut off the supply of compressed air from passage 30b' to supply valve 72 which is opened together with exhaust valve 73, thereby releasing air from equalizing reservoir 5 and thus from control chamber 78 of relay valve 41 via pipe 15, passage 15', exhaust valve 73, and exhaust port 77.

The resultant reduction of pressure in relay valve chamber 78 creates a pressure differential across piston 79. Relay valve 41 is thus actuated to effect opening of its exhaust valve 82, thereby releasing air from brake pipe 1 via branch pipe 1a, passage 1a', the open exhaust valve 82, and exhaust passage 83.

Each car control valve device is operative in response to this reduction of brake pipe pressure to interrupt the exhaust of brake cylinder pressure to atmosphere and to connect supply reservoir pressure to the brake cylinder.

At the same time, suppression valve spool 68 of brake valve device 36 is moved in a left-hand direction by cam 69 to make the passage connections, as indicated, in the position diagram of FIG. 3. Passage 26' is aligned with spool valve groove 85 and passage 3' is aligned with spool groove 86. Compressed air supplied via passage 30b' and 30b" pressurizes passage 26' via spring chamber 42 and central passage 87 of spool 68, while passage 3' is depressurized via exhaust port 71. Pressurization of passage 26' and thus pipe 26 causes pressure switch 63 to connect power from wire B+ to application wire 45 via wires 65 and 66, thereby energizing the application magnet valve on each car. Depressurization of passage 3' and thus pipe 3 causes pressure switch 64 to connect power from wire B+to holding wire 47 via wires 65 and 67, thereby energizing the holding magnet valve on each car. In the energized condition of the application magnet valve on each car, brake pipe pressure is exhausted at each car in parallel with the exhaust of brake pipe pressure via relay valve exhaust passage 83. In the energized condition, the holding magnet valve cuts off the venting of brake cylinder pressure at each car control valve.

The resultant brake application provided by each car control valve device is thus determined by the degree of brake pipe pressure reduction, which is in turn determined by the duration brake valve handle 37 remains in service position.

LAP

When a reduction of brake pipe pressure is achieved corresponding to the degree of brake application desired, the brake valve handle is moved to Lap position. Regulating valve spool 74 is moved in the left-hand direction by cam 75, but not sufficiently to open the porting from passage 30b' to supply valve 72.

The supply of compressed air in passage 30b' thus continues to be cut off as exhaust valve 73 is closed by its spring 84, thereby terminating the reduction of equalizing reservoir pressure via exhaust valve 73 and exhaust port 77. Since brake pipe pressure follows the equalizing reservoir pressure, the reduction of brake pipe pressure at relay valve 41 is also terminated by the self-lapping action of the relay valve.

This movement of handle 37 to Lap position concurrently causes cam 69 to move suppression valve 40 in a rightward direction to a position in which passages 3' and 26' are connected to exhaust port 71 via spool valve groove 86 to vent these passages, as indicated in the position diagram of FIG. 3. Pipes 3 and 26 are accordingly vented via these vented passages 3' and 26'. Accordingly, pressure switch 63 disconnects power to application wire 45, while pressure switch 64 connects power from wire B+ to holding wire 47. The application magnet valve on each car is thus deenergized, while the holding magnet valve on each car remains energized. The venting of brake pipe pressure is thus cut off at each car and the brake pipe pressure reduction is halted. Each car control valve responds to this reduction of brake pipe pressure to supply pressure to the car brake cylinder.

HOLDING

A Holding position of brake valve handle 37 is provided between Release and Lap positions, as indicated in the position diagrams of FIGS. 2 and 3. In providing a Holding position, it is desired to recharge brake pipe 1, as normally occurs in Release position, but without the attendant release of the brakes. In order to achieve this, regulating valve 39 assumes a condition corresponding to Release position, while suppression valve 40 assumes a condition corresponding to Lap position, when brake valve handle 37 is set in Holding position.

It will be appreciated, therefore, that suppression valve 40 in Holding position is conditioned to provide the same pneumatic connections made in Lap position. Therefore, passages 3' and 26' are vented, as are the corresponding pipes 3 and 26, via spool valve groove 86 and the suppression valve exhaust port 71. Accordingly, pressure switch 63 disconnects wire B+ from application wire 45, and pressure switch 64 connects wire B+to wire 47. The holding magnet valves throughout the train are thus effective to cut off the exhaust of brake cylinder pressure, while the application magnet valves are concurrently cutting off brake pipe venting, as explained relative to Lap position.

At the same time, pressure regulating module 36, in Holding position, establishes the same operating condition as provided in Release position, in that passage 15' is recharged with compressed air from main reservoir pipe 30 via branch pipe 30b, passage 30b', spool valve 74, and supply valve 72. In recharging passage 15', equalizing reservoir pressure is accordingly increased via penalty application valve 32, being effective at relay valve 41 of brake valve module 38 to effect a corresponding increase in brake pipe pressure.

Each car control valve device is operative in response to this increase in brake pipe pressure, in a well-known manner, to exhaust brake cylinder pressure via the car holding magnet valve. However, due to the holding magnet valve being energized in the Holding position, as heretofore explained, the exhaust of brake cylinder pressure via the holding magnet valve is cut off from atmosphere to interrupt the venting of brake cylinder pressure Accordingly, brake pipe pressure is recharged to the pressure setting of pressure regulating module 36 without a consequent release of the train brakes occurring. Electrified control of the train brakes with pneumatic back-up is thus obtained, in which the train operator is provided with a brake valve handle position that provides optional recharging of the brake pipe pressure while maintaining a brake application in effect.

In accordance with the foregoing, it will be appreciated that transmission of electric brake control signals via trainline wires 45 and 47 to each car of the train causes the brakes to be operated in an electropneumatic mode for fast, simultaneous response and smooth control. It will also be appreciated that concurrent transmission of a corresponding pneumatic brake control signal to each car of the train via the trainline brake pipe provides a pneumatic back-up mode of control in the event the electropneumatic control should fail. The electropneumatic mode may also be intentionally cut out, in which case the pneumatic mode of control is used as the primary brake control.

Penalty application valve 32 employs spool valve member 52 for the purpose of venting equalizing reservoir pressure independently of brake valve device 31 when an unsafe train operating condition arises because of operator neglect in order to provide a penalty brake application, while release control spool valve 60 is employed to interrupt the equalizing reservoir charging path following reset of the penalty application valve spool member 52 until such time as the brake valve handle 37 is positively returned to Release position. The purpose of withholding the recharge of equalizing reservoir pressure until the brake valve handle is moved to Release position is to prevent an inadvertent increase in equalizing reservoir pressure when spool member 52 of the penalty application valve 32 resets which, in turn, would cause an increase in brake pipe pressure and a consequent undesired release of the brakes. This is a necessary and well-known feature of penalty application valve 32 when operating in a pneumatic mode of brake control. Since pipe 3 is pressurized in Release position and is vented in all other handle positions, the pressure in pipe 3 has typically been utilized to reset release control spool valve 60. In this manner, the release control spool valve 60 is not reset until the brake valve handle 37 is, in fact, moved to Release position, so that prior to movement of handle 37 to Release position, the equalizing reservoir charging path continues to be interrupted, thereby preventing an undesired brake release.

It will be appreciated, however, that when operating in electropneumatic mode, this equalizing reservoir charging path must be intact in Holding position, as well as Release position, in order to permit charging of the trainline brake pipe, as hereinbefore explained.

In accordance with a first embodiment of the invention, as shown in FIG. 1, electromagnetic valve 92 is employed to satisfy the requirements of the system as regards control of release control spool valve 60 in both electropneumatic and pneumatic modes of brake control.

When pneumatic mode is effected, due to failure of the electropneumatic mode or electropneumatic mode being cut out, pressure switch 64 and holding trainline wire 47 are deenergized. Electromagnetic valve 92 is accordingly deenergized, allowing return spring 98 to position the valve such that inlet 96 is connected to outlet 94. Since inlet 96 is connected to pipe 3 via pipe 3a, pressure is only connected to the face of release control spool valve 60 via pipe 95 and passage 90 when pipe 3 is pressurized. As can be seen from the position diagram of FIG. 3, this only occurs in Release position of brake valve handle 37. In all other brake valve handle positions, pipe 3 is vented so that release control spool valve 60 remains actuated to interrupt the equalizing reservoir charging path following actuation and subsequent reset of penalty application spool valve 52, as desired.

In electropneumatic mode, which is intended to be the normal mode of brake control when employing a brake valve of the type described in the foregoing, the electric brake control is cut in. Now when pipe 3 is depressurized in all handle positions, except Release position, and most notably in Holding position, holding wire 47 is energized via power line B+, branch wire 65, pressure switch 64, and branch wire 67. Electromagnetic valve 92 is accordingly energized via holding wire 47 and branch wire 93. In the energized condition of electromagnetic valve 92, inlet 97 is connected to outlet 94, this being necessary since inlet 96 is only pressurized in Release position, as previously explained. Main reservoir pressure is connected to the face of release control spool valve 60 via pipe 30, branch pipes 30a and 30c, inlet 97, outlet 94 of electromagnetic valve 92, pipe 95, and passage 90 of penalty application valve 32.

When brake valve handle 37 is in Release position, pipe 3 is pressurized, thereby causing pressure switch 64 to deenergize holding wire 47 and consequently electromagnetic valve 92. Outlet 94 is thus switched back to inlet 96, which is pressurized via pipe 3a and pipe 3, as before.

It will now be appreciated that in all handle positions, including Release and Holding positions during electropneumatic mode of brake control, the equalizing reservoir charging communication via release control spool valve 60 is maintained intact. Since brake pipe pressure is determined in accordance with the equalizing reservoir pressure, as is well-known, brake pipe pressure is thus assured of being recharged in Holding position without releasing the train brakes, in accordance with the advantage realized by electropneumatic-type brake valve 31.

In accordance with the alternate embodiment of the invention, as shown in FIG. 4, a double check valve 99 is provided having one inlet 100 connected to pipe 3a, the other inlet 101 connected to outlet 94 of electromagnetic valve 92 and an outlet 102 connected to pipe 95. In addition, inlet 96 of electromagnetic valve 92 is vented instead of being connected to pipe 3a. In all other respects, this embodiment is identical to the embodiment of the invention described relative to FIG. 1.

In pneumatic mode of brake control, electromagnetic valve 92 is deenergized, thereby venting inlet 101 of double check valve 99. Thus, pressure in pipe 3 and effective at double check valve inlet 100, when brake valve handle 37 is in Release position, is connected to outlet 102 and thence to the face of release control spool valve 60 to thereby establish charging of equalizing reservoir 5 via release control spool groove 91. In all handle positions, other than Release position, however, pipe 3 is vented so that no pressure is transmitted to the face of release control spool valve 60, which is accordingly free to be actuated to cut off the equalizing reservoir charging path and thereby prevent the inadvertent release of the brakes, as previously discussed.

In electropneumatic mode of brake control, electromagnetic valve 92 is energized in Holding position in accordance with energization of holding wire 47 by pressure switch 64 in response to pipe 3 being vented in all handle positions, except Release position. In the energized condition, inlet 97 of electromagnetic valve 92 is connected to outlet 94, thereby connecting compressed air from main reservoir pipe 30 to the face of release control spool valve 60.

In Release position of brake valve handle 37, electromagnetic valve 92 is deenergized, as explained above relative to pneumatic mode of control, thus connecting compressed air from pipe 3 to the face of release control spool valve 60, to thereby establish charging of equalizing reservoir 5 via release control spool groove 91. It will be appreciated, therefore, that in all handle positions of brake valve device 31, including Release and Holding positions, the face of release control spool valve 60 is pressurized during electropneumatic mode of brake control to prevent the interlock valve from being actuated in response to pressurization of pipe 8 when spool member 52 resets following actuation of penalty application valve 32, as is well-known. Thus, the integrity of the equalization reservoir charging communication is maintained so that charging of brake pipe pressure is assured in Holding position when operating in electropneumatic mode of brake control, in order to realize the advantage of brake valve device 31 in recharging the brake pipe without concurrently effecting a release of the train brakes.

We claim:

1. An electropneumatic brake control system for a railway vehicle having trainline wires including a holding wire via which electric brake control signals are transmitted for effecting control of the vehicle brakes comprising:
   (a) a source of fluid under pressure;
   (b) an equalizing reservoir;
   (c) a fluid pressure flow path;
   (d) a brake valve device having a Release position, a holding position, and a Service Position comprising:
      (i) regulating valve means for charging said equalizing reservoir from said source of fluid under pressure via said flow path in said Release and Holding positions, and for releasing fluid under pressure from said equalizing reservoir via said flow path in said Service position;
      (ii) a first passageway; and
      (iii) suppression valve means for pressurizing said first passageway from said source of fluid under pressure in said Release position and depressurizing said first passageway in said Holding position; and
   (e) penalty brake application valve means for providing a penalty brake application when an unsafe operating condition of said train arises comprising:
      (i) first and second valve means arranged in series in said flow path for establishing fluid pressure communication between said regulating valve means and said equalizing reservoir when said first and second valve means are both in a reset position, and for interrupting said communication when either one of said first and second valve means is in an actuated position, said first valve means in said actuated position further releasing fluid pressure from said equalizing reservoir independently of said regulating valve means when an unsafe operating condition of said vehicle arises; and
      (ii) a second passageway, said second valve means being operated to said actuated position in response to pressurization of said second passageway; and
   (f) electropneumatic valve means for connecting said second passageway to said first passageway in response to deenergization of said holding wire and for connecting said source of fluid under pressure to said second passageway in response to energization of said holding wire.

2. An electropneumatic brake control system, as recited in claim 1, wherein said electropneumatic valve means comprises a two-position, three-way, spring-returned, magnet valve device having a first inlet connected to said first passageway, a second inlet connected to said source of fluid under pressure, an outlet connected to said second passageway, and a solenoid operator connected to said holding wire.

3. An electropneumatic brake control system, as recited in claim 2, wherein said outlet is cut off from said second inlet and connected to said first inlet when said solenoid operator is deenergized, and said outlet is cut off from said first inlet and connected to said second inlet when said solenoid operator is energized.

4. An electropneumatic brake control system, as recited in claim 1, wherein said electropneumatic valve means comprises:
   (a) a two-position, three-way, spring-returned, magnet valve device having a first inlet connected to atmosphere, a second inlet connected to said source of fluid under pressure, an outlet, and a solenoid operator connected to said holding wire; and
   (b) a double check valve device having one inlet connected to said outlet of said magnet valve device, another inlet connected to said first passageway, and an outlet connected to said second passageway.

5. An electropneumatic brake control system, as recited in claim 4, wherein said outlet of said magnet valve device is cut off from said second inlet thereof and connected to said first inlet thereof when said solenoid operator thereof is deenergized, and said outlet of said magnet valve device is cut off from said first inlet thereof and connected to said second inlet thereof when said solenoid operator is energized.

6. An electropneumatic brake control system, as recited in claim 1, wherein said second valve means comprises:
   (a) a bore;
   (b) a spool valve member reciprocally disposed in said bore; and
   (c) a control chamber formed between the end of said bore and one face of said spool member to which said second passageway is connected.

7. An electropneumatic brake control system, as recited in claim 5, further comprising:
   (a) said fluid pressure flow path including third and fourth passageways, said third passageway being connected to said source of fluid under pressure via said regulating valve means in said Release position, and said fourth passageway being connected to said equalizing reservoir; and
   (b) said spool valve member having an annular groove via which said third and fourth passageways are interconnected in said reset position of said second valve means.

8. An electropneumatic brake control system, as recited in claim 7, wherein said annular groove in said actuated condition of said second valve means is out of registry with at least one of said third and fourth passageways.

* * * * *